US006416045B1

(12) United States Patent
Morroney

(10) Patent No.: US 6,416,045 B1
(45) Date of Patent: Jul. 9, 2002

(54) ROTARY CLAMP HAVING PREDETERMINED ADJUSTABLE CLAMPING ANGLES

(75) Inventor: Wayne Morroney, Troy, MI (US)

(73) Assignee: Norgren Automotive, Inc., Clinton Township, MI (US)

( * ) Notice: Subject to any disclaimer, the term of this patent is extended or adjusted under 35 U.S.C. 154(b) by 0 days.

(21) Appl. No.: 09/626,271

(22) Filed: Jul. 25, 2000

(51) Int. Cl.[7] ................................................ B23Q 3/08
(52) U.S. Cl. ........................... 269/32; 269/27; 269/228
(58) Field of Search ............................ 269/32, 27, 228

(56) References Cited

U.S. PATENT DOCUMENTS 4,637,597 A 1/1987 McPherson et al.
4,905,973 A 3/1990 Blatt
5,171,001 A 12/1992 Sawdon
5,215,295 A 6/1993 Hoover
5,257,774 A * 11/1993 Dykstra ....................... 269/32
5,704,600 A 1/1998 Robinson
5,884,903 A * 3/1999 Sawdon ....................... 269/32
6,199,847 B1 * 3/2001 Fukui .......................... 269/32

* cited by examiner

*Primary Examiner*—Joseph J. Hail, III
*Assistant Examiner*—Lee Wilson
(74) *Attorney, Agent, or Firm*—Young & Basile, P.C.

(57) ABSTRACT

A rotary clamp having a telescopic piston rod with predetermined adjustable lengths corresponding to predetermined rotational angles of a clamp arm. The rotary clamp utilizes a linear actuator for transmitting linear motion to the piston rods and a linkage assembly is connected to the piston rod to convert the linear motion of the piston rod into rotary motion of the clamp arm. The telescopic piston rod provides an outer shaft and an inner shaft wherein the outer shaft is connected to a piston in the linear actuator. The outer shaft also provides a bore extending from the free end of the outer shaft for receiving an inner shaft of the piston rod. The inner shaft of the piston rod has a plurality of apertures extending transverse to and spaced along the longitudinal axis of the inner shaft. The apertures of the inner shaft may correspondingly align with an aperture provided in the outer shaft. A pin is inserted through correspondingly aligned apertures of the inner shaft and the outer shaft to provide a predetermined length of the piston rod which in turn corresponds to a predetermined rotational angle of the clamp arm.

15 Claims, 3 Drawing Sheets

ROTARY CLAMP HAVING PREDETERMINED ADJUSTABLE CLAMPING ANGLES

FIELD OF THE INVENTION

The present invention relates, in general, to rotary clamps having linear actuators, and more particularly, to a rotary clamp having a telescopic piston rod with predetermined adjustable lengths that correspond to predetermined rotational angles of a clamp arm.

BACKGROUND OF THE INVENTION

Rotary clamps are known of the type in which linear actuator reciprocating movement is adapted to be translated into rotary movement of a clamp arm. The linear actuator is typically powered by a fluid motor, and a linkage assembly is provided that converts the linear actuator movement into rotary motion of the clamp arm. The linear motion of the linear actuator is often transmitted to the linkage assembly by a piston rod. It is known to provide a threaded engagement between the end of the piston rod and the linkage assembly so that the length of the piston rod and the linkage assembly can be incrementally adjusted to a predetermined rotational angle of the clamp arm. This often requires repeated gaging and measurement of the clamp arm to ensure that the piston rod has been properly adjusted. In addition, the amount of adjustment is limited to the amount of threaded engagement available for adjustment.

To adjust the orientation of the clamp arm, previous designs have provided for angular adjustment of the clamp arm about the clamp arm's own pivotal axis. These designs provide for the releaseable and adjustable fastening of the clamp arm to a portion of the rotary clamp. This allows the clamp arm to be positioned and adjusted relative to its pivotal axis, but it does not allow for the adjustment of the amount or size of the rotational angle. Since the rotary clamping angle of the clamp arm is a function of the length of the linear movement of the piston arm, the rotary clamping angle is not affected by the positional mounting of the clamp arm relative to its pivotal axis.

It would be desirable to provide a rotary clamp that allows for the adjustment of the size or the amount of the rotary clamping angle of the clamp arm. It would also be desirable to provide a rotary clamp that provides a range of predetermined adjustable clamping angles in which the clamp arm could be adjusted.

SUMMARY OF THE INVENTION

The present invention overcomes the above-noted shortcomings by providing a rotary clamp having a piston rod with predetermined adjustable lengths corresponding to predetermined, adjustable clamping angles of a clamp arm. The rotary clamp provides a linear actuator wherein the piston rod transmits linear motion to a linkage assembly. The linkage assembly has one end connected to the piston rod and another end connected to the clamp arm for converting linear motion of the piston rod into rotary motion of the clamp arm.

The piston rod is telescopic in that it provides an outer shaft connected to the linear actuator and an inner shaft connected to the linkage assembly. The inner shaft is and received by an elongated bore in the outer shaft. A connector releaseably connects the outer shaft to the inner shaft at predetermined adjustable lengths corresponding to predetermined rotational angles of the clamp arm. In the preferred embodiment, the connector comprises a pin removably received by one of a plurality of corresponding apertures in the outer shaft and the inner shaft of the piston rod. The inner shaft has a plurality of apertures which extend through the inner shaft substantially perpendicular to the longitudinal axis of the inner shaft. The apertures are axially spaced along the longitudinal axis of the inner shaft at predetermined distances corresponding to predetermined angles of the clamp arm.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
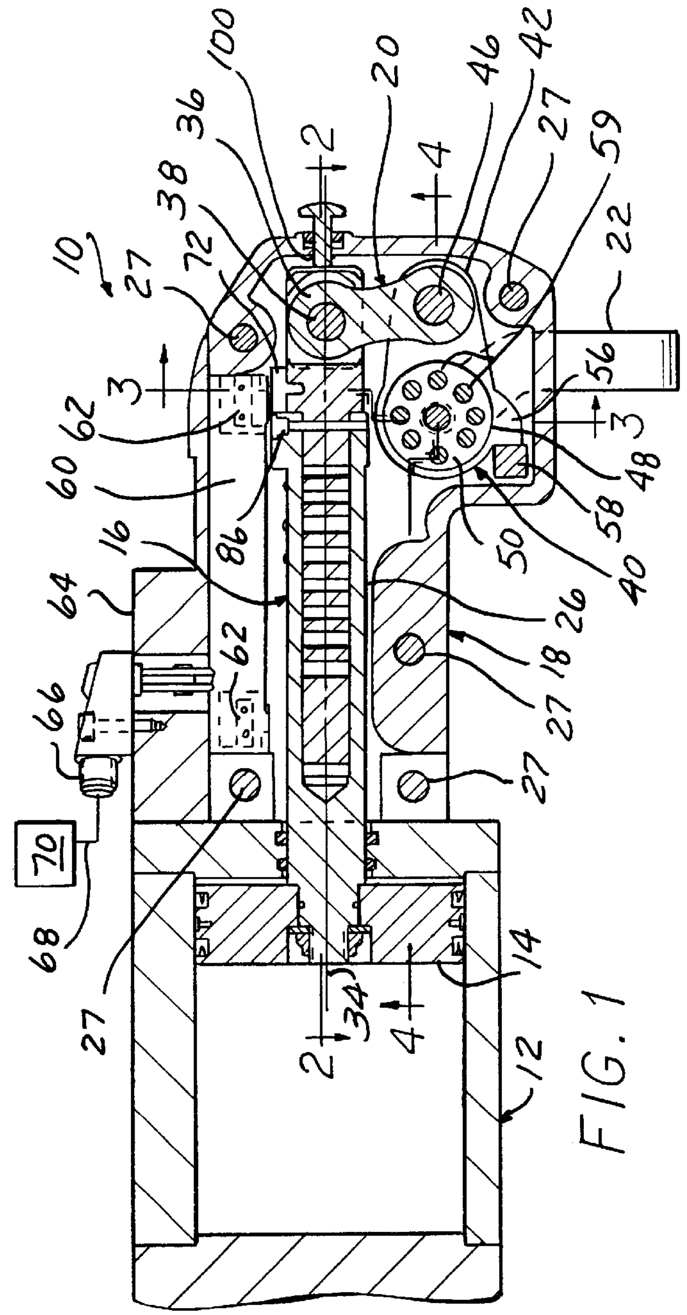
FIG. 1 is a cross-sectional view of the rotary clamp of the present invention in a clamped position.
Figure 4:
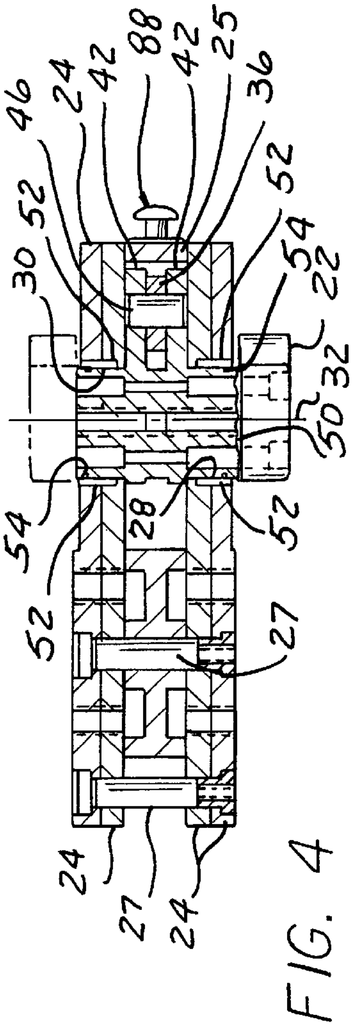
FIG. 4 is a cross-sectional view of the rotary clamp taken in the direction of 4—4 in FIG. 1.
Figure 2:
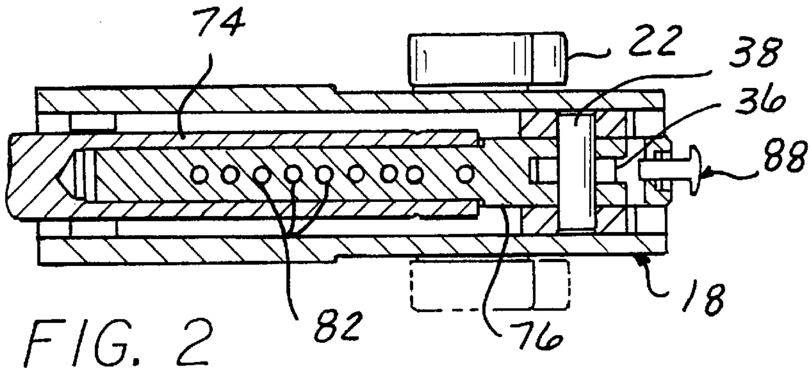
FIG. 2 is a cross-sectional view of the rotary clamp taken in the direction of arrows 2—2 in FIG. 1.
Figure 3:
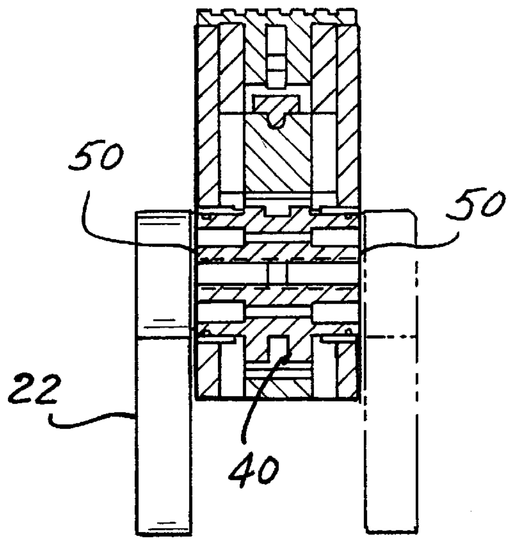
FIG. 3 is a cross-sectional view of the rotary clamp taken in the direction of 3—3 in FIG. 1.

Referring to the drawings, the present invention will now be described in detail with reference to the preferred embodiment.

Figure 5:
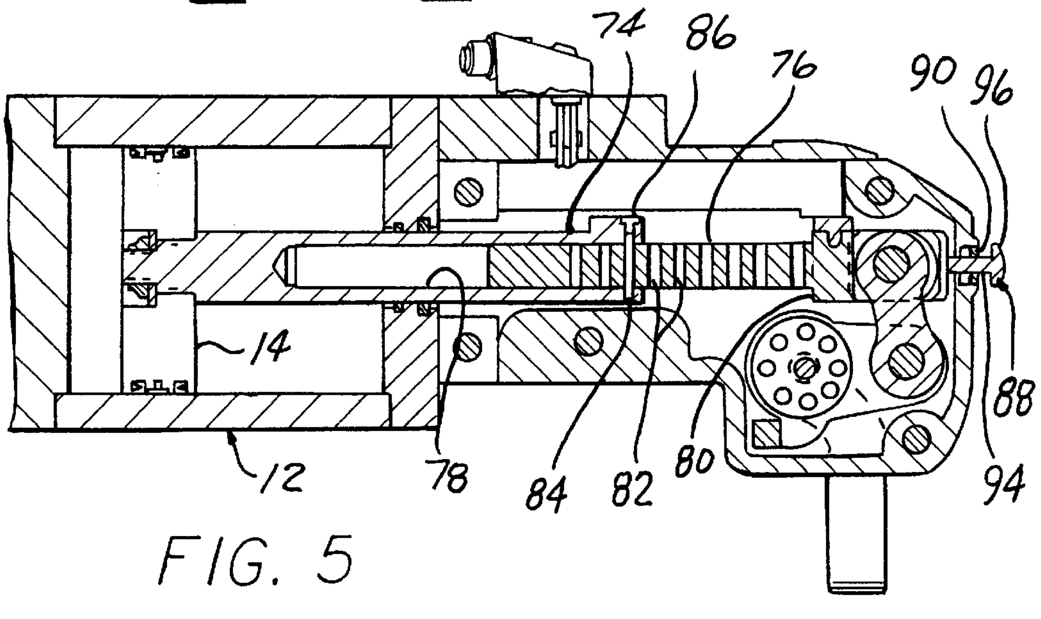
FIG. 5 is a cross-sectional view of the rotary clamp in the clamped position wherein the piston rod is in a lengthened position corresponding to a smaller rotational angle of the clamp arm.
Figure 6:
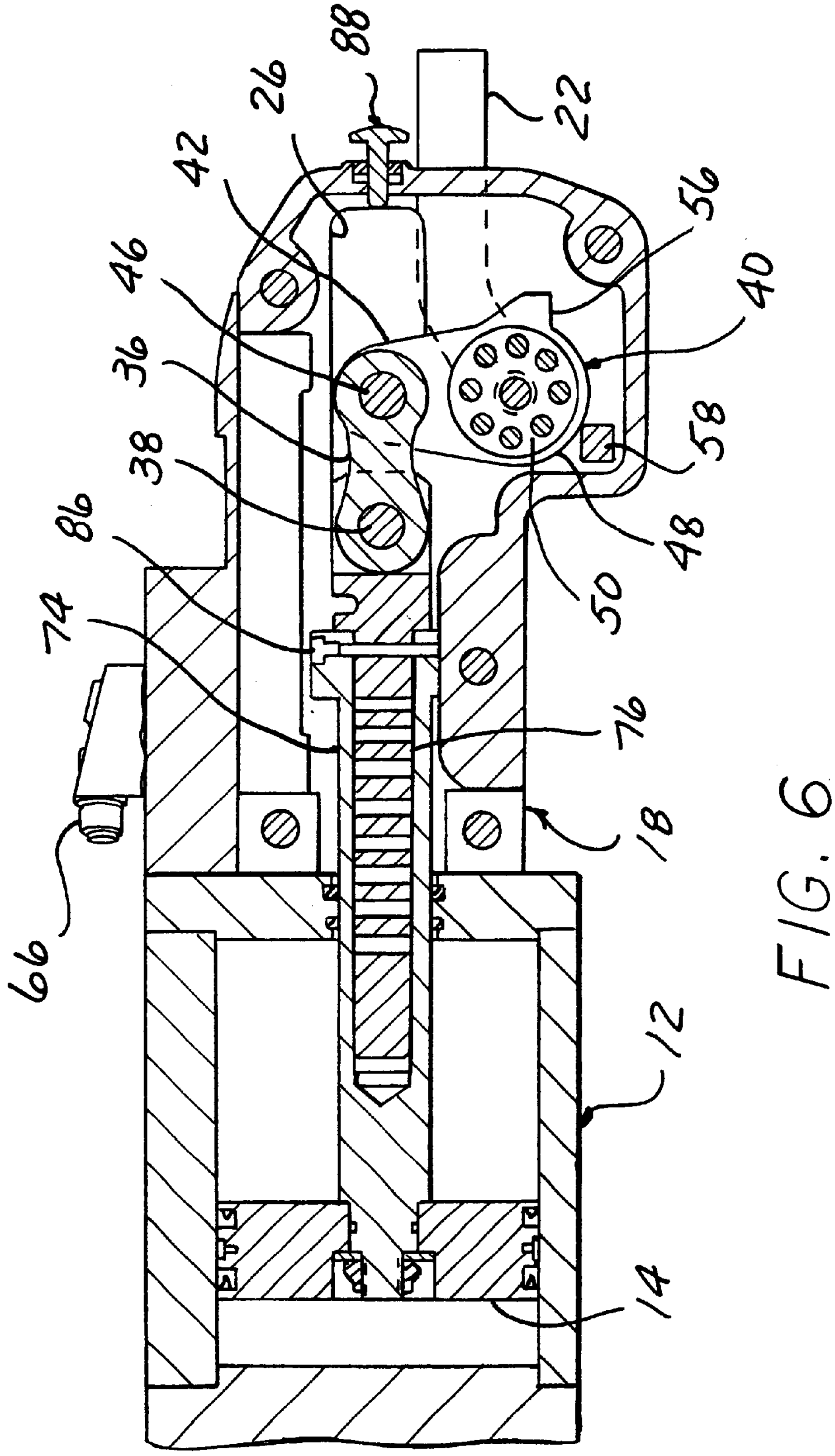
FIG. 6 is a cross-sectional view of the rotary clamp in FIG. 1 in an unclamped position.

FIGS. 1–4 illustrate an enclosed, powered rotary clamp 10 as defined in the present invention. The rotary clamp 10 is actuated between a clamped position, as seen in FIGS. 1 and 5, and an unclamped position, as seen in FIG. 6, by means of a fluid cylinder or linear actuator 12. The linear actuator provides a piston 14 having a piston rod 16 connected to and extending from the piston 14. The fluid cylinder or linear actuator 12 is preferably pneumatic, but the fluid cylinder or linear actuator 12 may also be hydraulic. The linear actuator 12 provides linear reciprocating movement to the piston rod 16 which in turn is coupled to an internal mechanism disposed within a housing 18 of the rotary clamp 10. The internal mechanism of the rotary clamp 10 provides a linkage assembly 20 that converts the linear motion of the piston rod 16 into rotary motion of a clamp arm 22.

The housing 18 of the rotary clamp 10 is attached to one end of the linear actuator 12 and is formed by a plurality of stacked planar plates 24. The plates 24 are separated by a spacer 25 to create a hollow region within the housing 18. The planar plates 24 are secured and fastened together by a plurality of dowel rods 27 press-fit through commonly aligned apertures in the planar plates 24. The plates 24 of the housing 18 provide an elongated internal guide slot 26 formed therein and extending the length of the housing 18. The end of the housing 18 adjacent the linear actuator 12 is open to receive the free end of the piston rod 16 within the guide slot 26. The opposite end of the guide slot 16 is closed by the end portion of the housing 18. The housing 18 also includes a pair of coaxial apertures 28, 30 having a common axis 32 offset from and substantially perpendicular to a longitudinal axis 34 of the guide slot 26.

To convert the linear motion of the piston rod 16 into rotary motion of the clamp arm 22, the free end of the piston rod 16 is connected to linkage assembly 20. The linkage assembly 20 provides a link 36 that is pivotally connected to the piston rod 16 by a pin 38. The opposite end of link 36 is pivotally connected to a shaft link 40. The shaft link 40 includes a two prong lever arm 42 having coaxial apertures extending through both of the prongs. A pivot pin 46 is inserted through the coaxial apertures in link 36 and the apertures provided in the lever arm 42 to provide a pivotal connection between link 36 and lever arm 42.

The shaft link 40 also includes a pivot pin 48 that is integrally connected to the lever arm 42. The pivot pin 48 is substantially cylindrical and is rotatably disposed within the pair of coaxial apertures 28, 30 for angular movement about the common axis 32. The pivot pin 48 has at least one end 50 extending outwardly from the housing 18 through one of apertures 28, 30, and preferably, the pivot pin 48 has an end 50 extending from each of apertures 28, 30. The pivot pin 48 is rotatably supported in the housing 18 by bushings 52. A flexible O-ring seal 54 is provided at each end of coaxial apertures 28, 30 to seal pivot pin 48 with respect to the housing 18. The shaft link 40 also provides a positive stop 56 integral with and extending from the lever arm 42. The positive stop 56 engages a stop block 58 having a longitudinal axis extending through the housing 18 in a direction substantially parallel to axis 32. The clamp arm 22 is mounted to the outer surface of the pivot pin 48 by a plurality of fasteners 59.

The rotary clamp 10 electronically tracks the position of the clamp arm 22 through two microswitches 62 mounted in an inner spacer 60 provided in the top portion of the housing 18. A cover 64 is provided to enclose the microswitches 62 from the outside elements. A terminal or plug 66 is mounted in the outside cover 64 for receiving a cable 68 which communicates with a programmable controller or microprocessor 70. The microswitches 62 are utilized to sense the presence of a tab 72 and a pin 86 which extend outwardly from the piston rod 16. The piston rod 16 moves along the internal guide slot 26, and the microswitches 62 sense the presence of the tab 72 or pin 86 by feeding the signal to the programmable controller or microprocessor 70. The programmable controller or microprocessor 70 processes the signal and determines the position of the clamp arm 22.

If the rotary clamp 10 realizes a loss of power and/or air pressure, a reciprocal member 88 is slidably disposed within an aperture 90 provided within the spacer 25 of the housing 18 to manually reset the rotary clamp 10. The reciprocal member 88 has a cylindrical body 94 with a larger cylindrical end portion 96 integral with the body 94 of the reciprocal member 88. The aperture 90 provided in the spacer 25 of the housing 18 is slightly larger than the diameter of the main body 94 of the reciprocal member 88 but smaller than the diameter of the end portion 96 of the reciprocal member 88. The opposite end 98 of the reciprocal member is prevented from passing through aperture 90 by use of a snap-ring 100 attached to the opposite end 98. This allows the reciprocal member 88 to slidably move through the aperture 90 while being positively captured by the end portions 96, 98 of the reciprocal member 88. The reciprocal member 88 moves along the same longitudinal axis 34 as the guide slot 26 and piston rod 16 such that the piston rod 16 engages and displaces the reciprocal member 88 when the piston rod 16 reaches the clamped position. When the rotary clamp 10 is in the clamped position and loss of power and/or air pressure occurs within the linear actuator 12, the reciprocal member 88 may be utilized to manually reset the rotary clamp 10 by striking the reciprocal member 88 from outside the housing 18 and forcing the piston rod 16 toward the unclamped position, thus driving the linkage assembly 20 away from the clamped position.

To adjust the clamping angle required to move the clamp arm 22 between the clamped and unclamped positions, the piston rod 16 provides a telescopic feature having an outer shaft 74 and an inner shaft 76 that combine to telescopically adjust the piston rod 16 along its longitudinal axis 34. The outer shaft 74 of the piston rod 16 is substantially cylindrical and has one of its ends connected to the piston 14 of the linear actuator 12. The outer shaft 74 provides a closed bore 78 which starts from the free end of the outer shaft 74 and extends along the longitudinal axis 34 of the outer shaft 74. The inner shaft 76 of the piston rod 16 has a substantially cylindrical portion and a rectangular portion integral thereto wherein the cylindrical portion is received within the bore 78 of the outer shaft 74. The rectangular portion of the inner shaft 76 provides a shoulder 80 that is wider than the bore 78 provided in the outer shaft 74. The shoulder 80 of the inner shaft 76 abuts the end of the outer shaft 74 to create a positive stop and prevent the cylindrical portion of the inner shaft 76 from traveling further into the bore 78 of the outer shaft 74.

The present invention provides predetermined adjustable lengths of the piston rod 16 by providing the inner shaft 76 with a plurality of apertures 82 that extend through the inner shaft 76 at angles substantially perpendicular to the longitudinal axis 34 of the inner shaft 76. The apertures 82 are spaced along the longitudinal axis 34 of the inner shaft 76 at predetermined distances that preferably correspond to 15° of angular rotation of the clamp arm 22 between apertures 82. The apertures 82 in the inner shaft 76 may be correspondingly aligned with an aperture 84 provided at the free end of the outer shaft 74. Alternatively, there may be more than one aperture 84 in the outer shaft 74 to provide a greater variety of piston rod 16 lengths corresponding to a greater variety of predetermined rotational angles of the clamp arm 22. When one of the apertures 82 in the inner shaft 76 is aligned with the aperture 84 provided in the outer shaft 74, a pin 86 is inserted through the corresponding apertures 82, 84 to establish a predetermined length of the piston rod 16. By moving the outer shaft 74 rearward and extending the length of the piston rod 16, the size or amount of the rotational angle of the clamp arm required to move the clamp arm 22 from the clamped position to the unclamped position 22 is reduced. Conversely, by moving the outer shaft 74 forward and reducing the length of the piston rod 16, the rotational angle of the clamp arm 22 is enlarged. Regardless of the size of the rotational angle of the clamp arm 22, the clamp arm 22 always starts or ends from a reference clamped position, as seen in FIG. 1.

In operation, the rotary clamp 10 may begin with the clamp arm 22 in the clamped position, as shown in FIG. 1. The user first determines the desired angle of rotation to move the clamp arm 22 between the clamped position and the unclamped position. Once this is determined, the user partially disassembles the rotary clamp 10 to remove the pin 86 from the corresponding apertures 82, 84 of the outer shaft 74 and the inner shaft 76. The piston 14 is either drawn back, as seen in FIG. 5, or pushed forward in the linear actuator 12 so that the outer shaft 74 moves relative to the inner shaft 76 in a telescopic relationship. The inner shaft 76 is maintained in a stationary position so that the clamp arm 22 remains in the clamped position. When the user determines the desired length of the piston rod 16 that corresponds to the desired angle of rotation of the clamp arm 22, the user inserts the pin 86 into the corresponding apertures 82, 84 of the outer shaft 74 and the inner shaft 76. The rotary clamp 10 is reassembled and ready to use.

While the invention has been described in connection with what is presently considered to be the most practical and preferred embodiment, it is to be understood that the invention is not to be limited to the disclosed embodiments but, on the contrary, it is intended to cover various modifications and equivalent arrangements included within the spirit and scope of the appended claims which scope is to be accorded the broadest interpretation so as to encompass all such modifications and equivalent structures as is permitted under the law.

What is claimed is:

1. A rotary clamp having predetermined, adjustable angles, comprising:

a linear actuator having a piston rod for transmitting linear motion;

a linkage assembly connected to said piston rod and connected to a clamp arm for converting said linear motion of said piston rod into rotary motion of said clamp arm; and said piston rod having predetermined adjustable lengths corresponding to a plurality of different predetermined rotational angles of said clamp arm.

2. The rotary clamp stated in claim 1, further comprising:

said piston rod is telescopic.

3. The rotary clamp stated in claim 2, said piston rod further comprising:

an outer shaft connected to said linear actuator and having an elongated bore;

an inner shaft connected to said linkage assembly and received by said bore of said outer shaft; and a connector releasably connecting said outer shaft to said inner shaft at said predetermined lengths of said piston rod.

4. The rotary clamp stated in claim 3, wherein said connector further comprises:

a pin removably received by correspondingly aligned apertures of said outer shaft and said inner shaft of said piston rod.

5. A rotary clamp having predetermined, adjustable clamping angles comprising:

a linear actuator having a telescopic piston rod for transmitting linear motion;

a linkage assembly connected to said telescopic piston rod and connected to a clamp arm for converting said linear motion of said piston rod into rotary motion of said clamp arm; and said telescopic piston rod having an outer shaft for telescopically receiving an inner shaft wherein said inner shaft and said outer shaft are releaseably connected at predetermined adjustable lengths corresponding to predetermined rotational angles of said clamp arm.

6. The rotary clamp stated in claim 5, further comprising:

said outer shaft connected to said linear actuator and having a bore for receiving said inner shaft; and a connector releasably connecting said outer shaft to said inner shaft at said predetermined adjustable lengths corresponding to said predetermined rotational angles of said clamp arm.

7. The rotary clamp stated in claim 6, further comprising:

said inner shaft having a plurality of apertures extending substantially transverse to said bore of said outer shaft;

said outer shaft having at least one aperture extending substantially transverse to said bore wherein said aperture of said outer shaft may be correspondingly aligned with said apertures of said inner shaft; and a pin removably inserted through said aperture of said outer shaft and one of said correspondingly aligned apertures of said inner shaft to connect said inner shaft to said outer shaft at said predetermined adjustable lengths of said piston rod corresponding to said predetermined rotational angles of said clamp arm.

8. The rotary clamp stated in claim 7, further comprising:

said apertures in said inner shaft spaced at said predetermined lengths corresponding to said predetermined rotational angles of said clamp arm.

9. The rotary clamp stated in claim 8, further comprising:

said apertures spaced at predetermined lengths corresponding to substantially 15° of rotational angle between said predetermined rotational angles of said clamp arm.

10. A rotary clamp having predetermined, adjustable clamping angles, comprising:

a linear actuator having a telescopic piston rod wherein said piston rod has an outer shaft connected to said linear actuator and an inner shaft received by said outer shaft wherein said piston rod transmits linear motion from said linear actuator;

a housing connected to said linear actuator and having said piston rod disposed therein;

a linkage assembly disposed within said housing and connected to a clamp arm and said inner shaft of said piston rod for converting said linear motion of said piston rod into rotary motion of said clamp arm;

said outer shaft having a bore for receiving said inner shaft and at least one aperture extending substantially transverse to said bore;

said inner shaft having a plurality of apertures extending substantially transverse to said bore wherein said apertures of said inner shaft may be correspondingly aligned with said aperture of said outer shaft; and a pin removeably inserted through said aperture in said outer shaft and through a correspondingly aligned aperture in said inner shaft to provide a predetermined length of said piston rod corresponding to a predetermined rotational angle of said clamp arm.

11. The rotary clamp stated in claim 10, further comprising:

said apertures in said inner shaft spaced at said predetermined lengths to correspond to said predetermined rotational angles of said clamp arm.

12. The rotary clamp stated in claim 11, further comprising:

said apertures spaced at predetermined lengths corresponding to substantially 15° of rotational angle between said predetermined rotational angles of said clamp arm.

13. A rotary clamp, comprising:

a piston rod for transmitting linear motion;

a linkage connected to said piston rod and to a clamp arm for converting said linear motion of said piston rod into rotary motion of said clamp arm; and said piston rod having predetermined adjustable lengths corresponding to a plurality of rotational angles of said clamp arm.

14. A rotary clamp, comprising:

a piston rod for transmitting a first degree of motion;

an actuator for actuating an end effector between an unclamped position and a clamped position;

an adjustable telescopic rod connected to said actuator and said effector for adjusting the position of said end effector in said unclamped position.

15. A rotary clamp having an actuator for moving a clamp arm between an unclamped position and a clamped position, the improvement comprising:

a telescopic rod for transferring motion of said actuator to said clamp arm.

* * * * *